(12) United States Patent
Gröne et al.

(10) Patent No.: US 11,402,734 B2
(45) Date of Patent: Aug. 2, 2022

(54) MULTI LENS ARRAY, LUMINOUS SOURCE AND VEHICLE

(71) Applicant: Hella GmbH & Co. KGaA, Lippstadt (DE)

(72) Inventors: Stefan Gröne, Brakel (DE); Michael Kleinkes, Marl (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/054,640

(22) PCT Filed: May 23, 2018

(86) PCT No.: PCT/EP2018/063454
§ 371 (c)(1),
(2) Date: Nov. 11, 2020

(87) PCT Pub. No.: WO2019/223859
PCT Pub. Date: Nov. 28, 2019

(65) Prior Publication Data
US 2021/0080816 A1    Mar. 18, 2021

(51) Int. Cl.
*G03B 21/20* (2006.01)
*F21S 41/275* (2018.01)
*G03B 21/14* (2006.01)

(52) U.S. Cl.
CPC ........ *G03B 21/2013* (2013.01); *F21S 41/275* (2018.01); *G03B 21/142* (2013.01); *G03B 21/208* (2013.01)

(58) Field of Classification Search
CPC .................................................... F21S 41/275
USPC ........................................................... 353/31
See application file for complete search history.

(56) References Cited

U.S. PATENT DOCUMENTS

| 4,868,725 A * | 9/1989 | Sakagawa ............. F21S 43/255 362/231 |
| 8,405,015 B1 | 3/2013 | Klein |
| 2011/0228231 A1 | 9/2011 | Schreiber et al. |

* cited by examiner

*Primary Examiner* — Jerry L Brooks
(74) *Attorney, Agent, or Firm* — Husch Blackwell LLP

(57) ABSTRACT

A multi-lens array is provided for a luminous source of a vehicle. The array includes at least one light source and multiple lens arrangements. Each lens arrangement includes a condenser lens and a projector lens as optical elements. The at least one light source is enabled to expose each of the multiple lens arrangements with light, and the projections of the multiple lens arrangements of this light interfere to form a single projected image.

15 Claims, 5 Drawing Sheets

MULTI LENS ARRAY, LUMINOUS SOURCE AND VEHICLE

CROSS REFERENCE

This application claims priority to PCT Application No. PCT/EP2018/063454, filed May 23, 2018, the entirety of which is hereby incorporated by reference.

FIELD OF THE INVENTION

The invention is related to a multi-lens array for a luminous source of a vehicle, comprising at least one light source and multiple lens arrangements, each lens arrangement at least comprising a condenser lens and a projector lens as optical elements, wherein the at least one light source is enabled to exposure each of the multiple lens arrangements with light and the projections of the multiple lens arrangements of this light interfere to form a single projected image. Further, the invention is related to a luminous source for a vehicle, comprising a multi-lens array. In addition, the invention is related to a vehicle, in particular a car, comprising a luminous source.

BACKGROUND

The principle of multi-lens arrays is known in the state-of-the-art and multi-lens arrays are therefore commonly used in modern technology. The usage of multi-lens arrays especially allows uniform light distributions, even if point-like light sources are used. Further on, such multi-lens arrays comprise especially small dimensions in the direction of the emitted light. Therefore, in particular in applications with limited installation space, multi-lens arrays can be used.

Further it is known, to use such multi-lens arrays to provide projections of images. For instance, single-coloured images can be achieved by using masks to shape the projected light. The respective mask is used to shade-out different parts of the light, and therefore a single-coloured projected image, which can also comprise spatial differences in intensity and/or brightness, can be achieved. Using more than one multi-lens array, especially at least three multi-lens arrays with light sources of three different colours (preferably red, green and blue), appropriate shaped masks for the different multi-lens arrays allows to project the coloured image as a superposition of the different lights of the respective multi-lens arrays. The necessity to use at least three multi-lens arrays with three different coloured light sources to achieve an image with all possible colours renders this solution complex, sumptuous and beyond that large building volumes are needed. Another possibility to project coloured images is the usage of microfilm, on which for each of the lens channels of the multi-lens array the image to be projected is depicted. Disadvantages of this solution are primarily caused by the usage of microfilm, as the material of the microfilm cannot stand high temperatures and/or illuminances. Especially the application in a vehicle is therefore rendered impossible.

SUMMARY OF THE INVENTION

It is an object of the present invention to overcome aforesaid problems at least partially. In particular, it is an object of the present invention to provide a simplified and/or more reliable and/or more durable multi-lens array, luminous source and/or vehicle, wherein especially coloured images can be projected in an easy and cost saving way.

Aforesaid object is achieved by a multi-lens array according to independent claim 1, by a luminous source according to claim 14 and by a vehicle according to claim 15. Further features and details of the invention result from the sub-claims, the description and the figures. Features discussed in details with respect to the inventive multi-lens array are also correlated with the inventive luminous source and the inventive vehicle and the other way round in each case.

According to a first aspect of the invention, the object is achieved by a multi-lens array for a luminous source of a vehicle, comprising at least one light source and multiple lens arrangements, each lens arrangement at least comprising a condenser lens and projector lens as optical elements, wherein the at least one light source is enabled to exposure each of the multiple lens arrangements with light and the projections of the multiple lens arrangement of this light interfere to form a single projected image. A multi-lens array according to the invention is characterized in that at least one of the lens arrangements comprises an at least partly transparent coloured picture element to form a coloured image in the projection of this at least one lens arrangement, and wherein the picture element comprises pigment elements arranged in and/or on an optical element of the at least one lens arrangement.

An inventive multi-lens array is especially designed to be used in a luminous source of a vehicle. This luminous source can be, for instance, a head light, a rear light, an interior light of the vehicle or an exterior light of the vehicle. At least one light source is used to produce light and multiple lens arrangements are further on used to collect this light and to project this light onto a surface. Each of the multiple lens arrangements comprises at least a condenser lens and a projector lens as optical elements, wherein the condenser lens faces the light source and is exposed by the light of the light source and wherein the projector lens faces the surface, onto which the image should be projected, and is optically coupled to the condenser lens. Also a single lens comprising a condenser lens section and a projector lens section respectively can be used in a lens arrangement according to the invention. In other words, light is emitted by the at least one light source and exposed on the condenser lenses of the multiple lens arrangements, further on, the light is transmitted to the condenser lenses in each of the multiple lens arrangements and by the condenser lenses then projected onto the surface, whereby on the surface, the projections of the multiple lens arrangements interfere to form a single projected image.

According to the invention, at least one of the lens arrangements comprises an at least partly transparent coloured picture element. This coloured picture element contains the information about a coloured image to be formed in the projection, visible in the projected image of the multiple lens array. To achieve this, the picture element and in particular also the pigment elements of the picture element are coloured and at least partly transparent. Therefore, light transferred through the lens arrangement with the picture element permeates also the picture element with the pigment elements, changes its colour and therefore transports further on the information to form a coloured image as part of the projected image of the multiple lens array. According to the invention, it is essentially to use this special picture element with the pigment elements as an intrinsic part of an optical element of the lens arrangement itself. As the picture element, and in particular its pigment elements, are at least partly transparent, a change of colour of the projected light to transport the information of the coloured image to be projected can be made as modification of the projected light.

This allows using a single, mono-coloured light source. Further on, especially the pigment elements can be chosen according to the requirements of the multiple lens array, especially regarding temperature and illuminance durability requirements. In particular, the usage of an inventive multiple lens array in vehicles can therefore be provided.

Further, a multi-lens array according to the invention can be characterized in that the pigment element comprises a pigment material with temperature durability higher than 80° C., preferably higher than 120° C., and/or illuminance durability higher than 500 klx, preferably higher than 1 Mlx. In luminous sources of vehicles temperatures of higher than 80° C. and illuminances of higher than 500 klx are often achieved. By using pigment elements, which comprise temperature durability higher than 80° C. and/or an illuminance durability of higher than 500 klx, a usage of a multi-lens array in a luminous source of a vehicle can easily be provided. Preferably, the pigment element comprises a pigment material with temperature durability higher than 80° C. and illuminance durability higher than 500 klx. Especially preferred is a pigment material with temperature durability higher than 120° C. and an illuminance durability of higher than 1 mlx. Degradation of the pigment material and therefore a loss of information of the projected image can therefore be avoided.

In addition, an inventive multi-lens array can be characterized in that the picture element, in particular at least the pigment elements of the picture element, is arranged and/or in the condenser lens of the at least one lens arrangement. In this first possible embodiment of an inventive multi-lens array the condenser lens is used as an optical element to comprise the picture element. This allows placing the picture element more or less at the beginning of the lens arrangement in question in the direction of the light of the light source.

Further, an inventive multi-lens array can be characterized in that the picture element, in particular at least the pigment elements of the picture element, is arranged on/in the projection lens of the at least one lens arrangement. In this additional and/or alternative second possible embodiment of an inventive multi-lens array, the projection lens is used as optical element to bear the picture element. In this embodiment, the picture element is more or less placed at the end of the lens arrangement in the direction of the light of the light source.

In an additional and/or alternative third embodiment of an inventive multi-lens array it is possible that the at least one lens arrangement comprises a picture frame as an optical element, wherein the picture element, in particular at least the pigment elements of the picture element, is arranged on and/or in the picture frame of the at least one lens arrangement. In this third possible embodiment of an inventive multi-lens array an additional optical element is present in the lens arrangement bearing the picture element. This additional optical element is a picture frame, on and/or in which the picture element is placed. Preferably, besides the picture element and its pigment elements respectively, the picture frame is transparent or at least mostly transparent and doesn't obstruct the light of the at least one light source. This picture frame can be placed at several positions in respect to the direction of the light in the at least one lens arrangement in question. For instance, the picture frame can be placed before the condenser lens, between the condenser lens and the projection lens or after the projection lens.

Further, such a picture frame can provide the ability to be exchanged, for instance, to change the projected image. Also it is possible, especially if a group of lens arrangements bear the same picture element, that a common picture frame with these several picture elements for the whole group of lens arrangements is used. The overall build-up of an inventive multi-lens array can be provided more easily.

Further, an inventive multi-lens array can be enhanced in that the picture frame of the at least one lens arrangement is arranged after the projection lens in direction of the light of the at least one light source. In this especially preferred embodiment of an inventive multi-lens array, the picture frame is placed more or less as the last optical element of the at least one lens arrangement. An especially high accessibility of the picture frame, for instance for changing the picture frame, can therefore be provided.

Also, a multi-lens array according to the invention can be characterized in that several, preferably all, lens arrangements comprise a coloured picture element, preferably the same coloured picture element. The higher the number of lens arrangements with picture elements, the higher the intensity and brightness of the projected image can be provided. By providing coloured picture elements on several, preferably all, lens arrangements, projected coloured image of high intensity and brightness can be provided especially easily. Further, it is possible that some of the lens arrangements only comprise parts of the coloured picture element, for instance to compensate projections on non-orthogonal surfaces to ensure a uniform intensity and brightness of the projected image.

Also, an inventive multi-lens array according to the invention can be characterized in that the pigment elements and the optical element on and/or in which the pigment elements are arranged, are monolithically built in a sandwich moulding process.

Therefore, the pigment elements can be inserted directly into and/or onto the optical element during the sandwich moulding process. This is an easy, fast and low-priced way to provide the optical element bearing the pigment elements of the picture element.

In an alternative embodiment of an inventive multi-lens array, the pigment elements and the optical element on and/or in which the pigment elements are arranged, are monolithically built in an additive assembly process. Also, in this embodiment, the pigment elements are inserted directly into and/or onto the optical element during the additive assembly process. Especially complex picture elements for complex projected images respectively can be provided easily in this particular embodiment of an inventive multi-lens array. As additive assembly process there are several techniques possible such as, for instance, selective laser sintering (SLS), stereolithography (SLA) fused deposition modelling (FDM) and others. Such an additive assembly process can also be called rapid prototyping.

In another alternative embodiment, the inventive multi-lens array can be characterized in that the pigment elements are formed as a printed layer onto a surface of the optical element on which the pigment elements are arranged. Printing the pigment elements onto a surface of the optical element is an especially easy, fast and low-price way to provide the picture element of an inventive multi-lens array, whereby printing is in most cases even more cost-efficient than sandwich moulding. Nevertheless, as the pigment elements are arranged on the surface of the optical element, there is a small risk of material loss during the usage of the inventive multi-lens array. For the arrangement of the pigment elements onto the surface of the optical element, several printing techniques are available, as for instance inkjet printing, screen printing, offset printing, pad printing and others.

Further, an inventive multi-lens array can be characterized in that at least one lens arrangement, especially several lens arrangements, preferably all lens arrangements, comprises an actuator element to change a focal point of the lens arrangement.

Changing a focal point of the lens arrangement according to the invention can be a displacement of the focal point of the lens arrangement in question in all three spatial directions. Preferably, changing the focal point and especially the respective displacements of the focal points are performed in such a way that the different projections of the lens arrangement still interfere to form a single projected image, especially showing the coloured image. An adaptation of the inventive multi-lens array on different projection surfaces can therefore be provided. Preferably, the inventive multi-lens array can be part of a system comprising the inventive multi-lens array, a camera, and an evaluation unit, wherein the camera monitors the projected image and the evaluation unit evaluates the information of the camera to control the projected image by changing a focal point of the lens arrangement in question by controlling the actuator element of the lens arrangement. A perfect sharp projected image, even on changing projecting surfaces, can therefore be provided.

Also, a multi-lens array according to the invention can be characterized in that several lens arrangements are grouped in at least two groups of lens arrangements, further, the multi-lens array comprises at least two light sources, wherein each of the at least two light sources can be controlled separately and is assigned to one of the at least two groups of lens arrangements. In other words, the at least two light sources can be the same or different types of light sources and can be switched on and off independently. As the lens arrangements in the different groups can interfere to form a single projected image, by choosing the number of switched-on light sources, a control of intensity and brightness of the projected image can be easily provided.

In an advanced embodiment of an inventive multi-lens array, the picture elements of the lens arrangements of the at least two groups of lens arrangements are adapted to form different coloured images in the projection of the lens arrangements. Therefore, each group of lens arrangements comprises a different coloured picture element and is therefore adapted to form a different coloured image in the projected image of the inventive multi-lens array. Therefore, by choosing the respective light source assigned to the respective group of lens arrangements, a change of the projected coloured image can be provided easily.

According to a second aspect of the invention, the object is achieved by a luminous source for a vehicle, comprising a multi-lens array. An inventive luminous source is characterized in that the multi-lens array is designed according to the first aspect of the invention. Therefore, a luminous source according to the second aspect of the invention can provide the same advantages as described above in respect to a multi-lens array according to the first aspect of the invention.

In a third aspect of the invention, the object is achieved by a vehicle, in particular a car, comprising a luminous source. An inventive vehicle is characterized in that the luminous source is designed according to the second aspect of the invention. A luminous source, according to the second aspect of the invention, comprises a multi-lens array according to the first aspect of the invention. All advantages as described above in respect to a luminous source according to the second aspect of the invention and according to a multi-lens array according to the first aspect of the invention can therefore be provided by a vehicle according to third aspect of the invention.

In the following, preferred embodiments of the invention are described based on supportive figures. Thereby, the features described in the claims and in the description can be each single or in every combination essential for the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
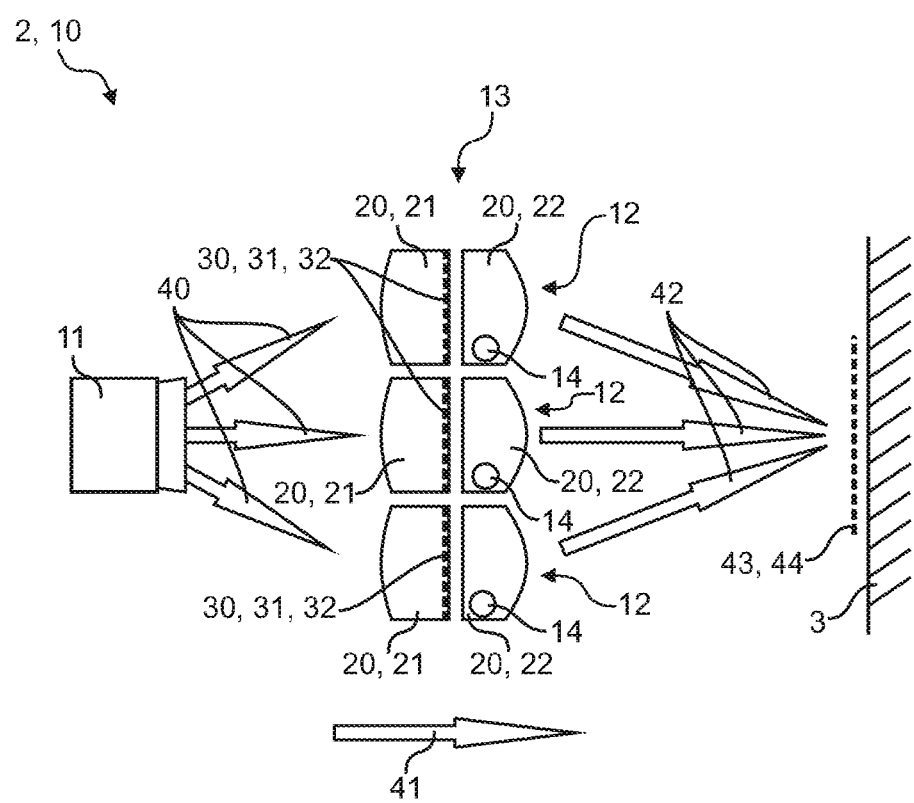
FIG. 1 is a first embodiment of an inventive multi-lens array.
Figure 2:
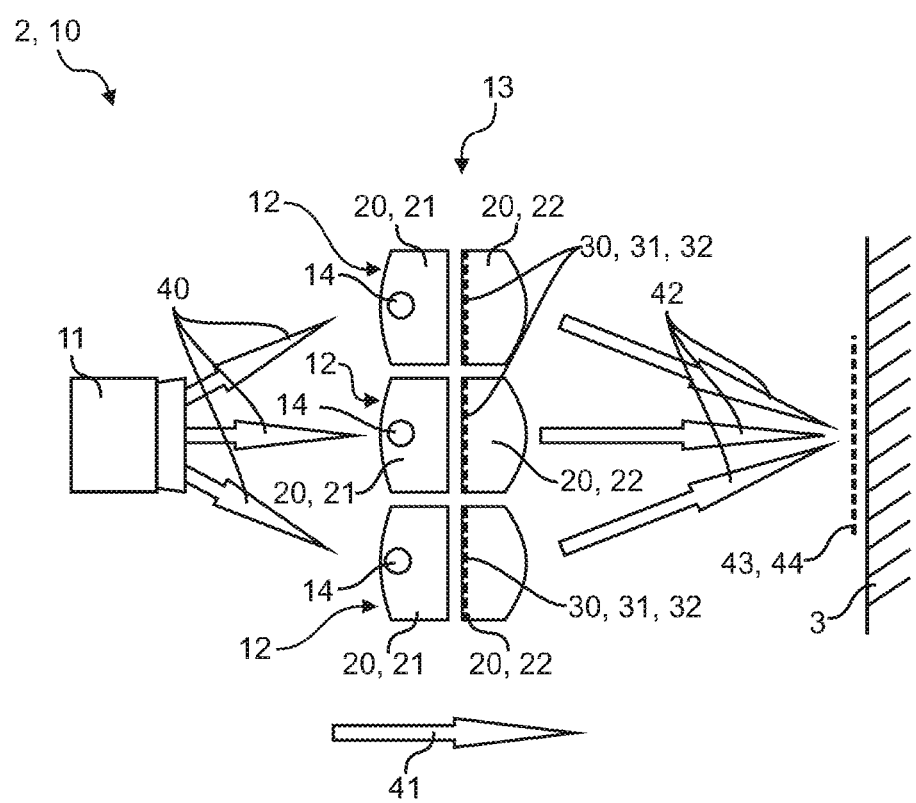
FIG. 2 is a second embodiment of an inventive multi-lens array.
Figure 3:
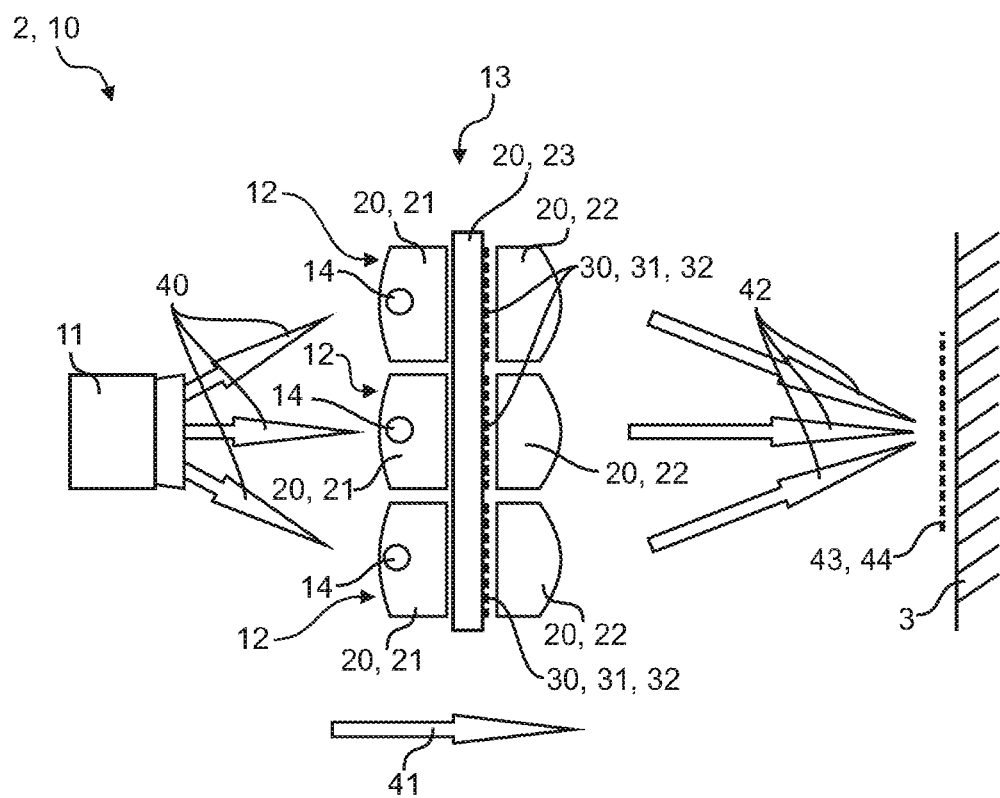
FIG. 3 is a third embodiment of an inventive multi-lens array.

FIGS. 1 to 3 show different embodiments of an inventive multi-lens array 10 as part of an inventive luminous source 2. The different embodiments are different in respect to the placement of the picture element 30 in one of the optical elements 20 of the multi-lens arrays 10. In the following, the FIGS. 1 to 3 are described together, wherein the differences of the different inventive multi-lens arrays 10 are addressed separately.

An inventive multi-lens array 10 is used in an inventive luminous source 2 to provide a projected image 43 on a projection surface 3. Therefore, the multi-lens array 10 comprises a light source 11 which emits light 40 in a light direction 41. The light source 11 exposures several lens arrangements 12 with light 40. The lens arrangements 12, grouped in one or several groups of lens arrangements 13, comprise at least a condenser lens 21 and a projector lens 22. Light 40 of the light source 11 is condensed by the condenser lenses 21 transmitted to the projector lenses 22 and afterwards send as projections 42 onto the projection surface 3. The projections 42 of the several projector lenses 22 of the lens arrangements 12 of a multi-lens array 10 interfere to form a single projected image 43. The shown embodiments of the inventive multi-lens array 10 comprise further an actuator element 14, for instance located in the projection lenses 22, see FIG. 1, or in the condenser lenses 21, see FIGS. 2 and 3. These actuator elements 14 allow changing a focal point of the projections 42 of the several lens arrangements 12 and therefore an adaptation on different projection surfaces 3.

To form a coloured image 44 as part of the projected image 43, it is essential for an inventive multi-lens array 10 that at least one of the optical elements 20 of at least one of the lens arrangements 12 comprises a picture element 30. These picture elements 30 respectively comprise pigment elements 31 containing pigment material 32. The pigment material 32 can be chosen such that it comprises temperature durability higher than 80° C. and/or illuminance durability higher than 500 klx. The usage of an inventive multi-lens array 10 and an inventive luminous source 2 respectively in a vehicle 1 (not shown) can therefore be provided easily.

In FIG. 1 the condenser lens 21 is used as optical element 20 to bear the pigment elements 31 of the picture element 30. As shown, the pigment elements 31 can be inserted into the condenser lens 21 as optical element 20, for instance in a sandwich moulding process or an additive assembling process.

FIG. 2 shows another possible embodiment of an inventive multi-lens array 10, wherein the protector lenses 22 are used as optical elements 20 to arrange the pigment elements 31 of the picture elements 30. As described above, the pigment elements 31 can be inserted into the projector lenses 22 already in the assembly of the projector lenses 22, for instance by using a sandwich moulding process or an additive assembling process.

FIG. 3 shows another possible embodiment of the inventive multi-lens array 10. In this embodiment, a picture frame 23 is inserted as an additional optical element 20 into the lens arrangement 12 of the multi-lens arrays 10. In this special embodiment, the picture frame 23 is placed after the projection lenses 22 in direction 41 of the light 40, wherein in other embodiments also different positions of the picture frame 23 in the respective lens arrangement 12 is possible. As shown, a common picture frame 23 can be provided for several lens arrangements 12. In this embodiment, the pigment elements 31 are placed onto a surface of the picture frame 23 as optical element 20. Such a placement can, for instance, be provided by a printing process.

The aforesaid possible embodiments of an inventive multi-lens array 10 are alternatives, wherein the different features can be exchanged. For instance, also in FIG. 1 or 2 a printing method can be used to print the pigment elements 31 as part of the picture element 30 onto the surface of the condenser lens 21 or projector lens 22, respectively. Also a picture frame 23 build up in a sandwich moulding process or an additive assembly process with pigment elements 31 inserted into the picture frame 23 is possible.

Figure 4:
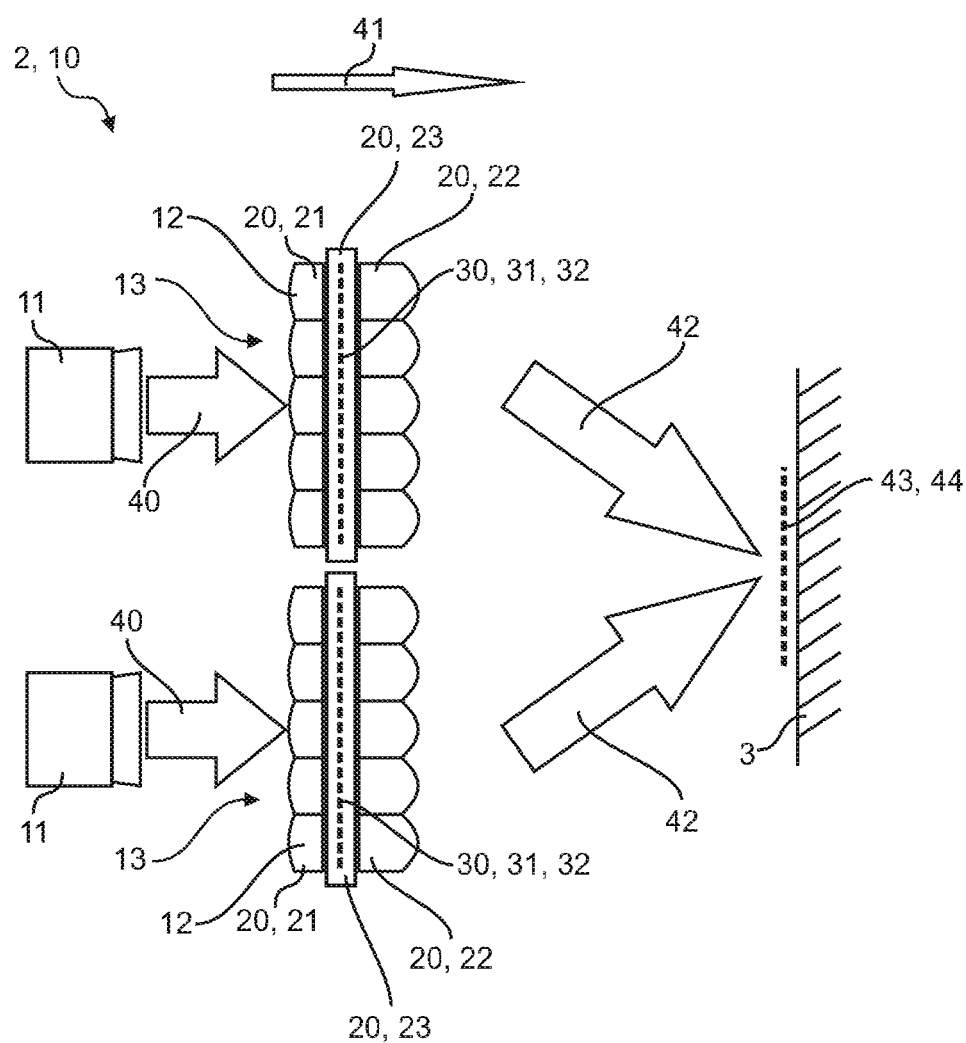
FIG. 4 is a fourth embodiment of an inventive multi-lens array.

In FIG. 4 another possible embodiment of an inventive multi-lens array 10 of an inventive luminous source 2 is shown. In this embodiment, the multi-lens array 10 comprises two different groups of lens arrangements 13, wherein for each group of lens arrangements 13 a separate light source 11 is assigned. All other features regarding both of the group of lens arrangements 13 are similar to the embodiment shown in FIG. 3, whereby also an exchange of this features with the respective features shown in FIGS. 1 and 2 are possible. The focus of FIG. 4 lies especially on the possibility to provide further control options of an inventive multi-lens array 10. By choosing the number of used light sources 11, a brightness and/or intensity of the projected image 44 can easily be adjusted. On the other hand, if the picture elements 30 of the two different groups of lens arrangements 13 are different, by choosing the respective light source 11, a change of the projected image 43, especially of the coloured image 44, can be provided easily.

Figure 5:
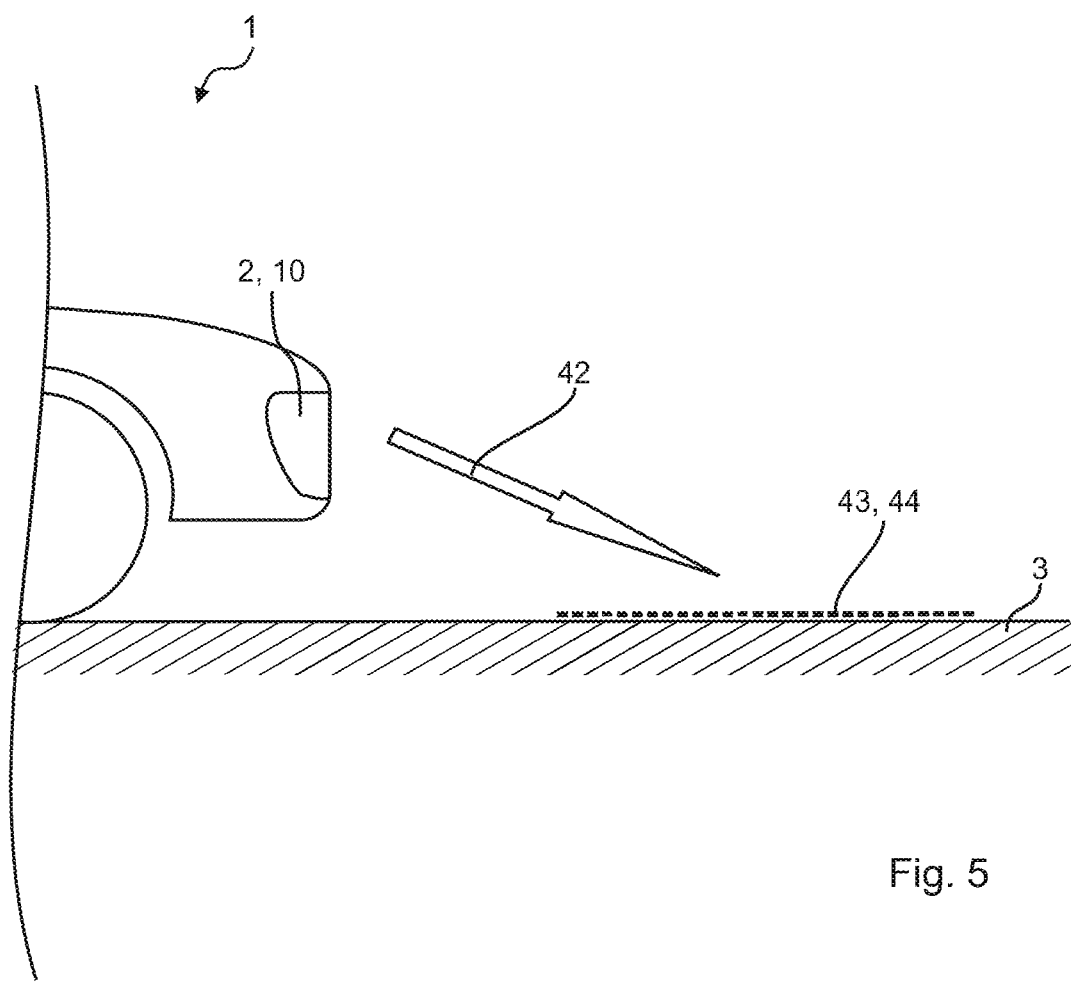
FIG. 5 illustrates an inventive vehicle with an inventive luminous source.

FIG. 5 shows an inventive vehicle 1, on which an inventive luminous source 2 comprising an inventive multi-lens array 10 is used. A projection 42 onto a surface 3 to form a projected image 43, comprising a coloured image 44 is shown. In this embodiment the luminous source 2 is form as a head light of the vehicle 1. In other embodiments, the luminous source 2 can be used also as rear light, interior light, exterior light or similar.

REFERENCE LIST 1 vehicle
2 luminous source
3 projection surface
10 multi lens array
11 light source
12 lens arrangement
13 group of lens arrangements
14 actuator element
20 optical element
21 condenser lens
22 projector lens
23 picture frame
30 picture element
31 pigment element
32 pigment material
40 light
41 direction
42 projection
43 projected image
44 coloured image

The invention claimed is:

1. A multi lens array for a luminous source of a vehicle, the multi lens array comprising:
   at least one light source; and
   multiple lens arrangements, wherein each lens arrangement includes respective optical elements that include a respective condenser lens and a respective projector lens,
   wherein light from the at least one light source is gathered by the respective condenser lens of each lens arrangement and outputted therefrom through the respective projector lens,
   wherein the respective projector lens of each lens arrangement outputs the light received from the respective condenser lens of each lens arrangement as a respective interfering light projection,
   wherein the respective interfering light projection output from the respective projector lens of each lens arrangement combine together to form a single projected image,
   wherein at least one of the lens arrangements comprises a first at least partly transparent colored picture element that forms a colored image in the respective interfering light projection output from the at least one lens arrangement, and
   wherein the first at least partially transparent colored picture element comprises pigment elements arranged in and/or on at least one of the respective optical elements of the at least one lens arrangement.

2. The multi lens array according to claim 1, wherein the pigment elements comprises a pigment material with temperature durability higher than 80° C. and/or illuminance durability higher than 500 klx.

3. The multi lens array according to claim 1, wherein the pigment elements of the picture element are arranged on and/or in the respective condenser lens of the at least one lens arrangement.

4. The multi lens array according to claim 1, wherein the pigment elements of the picture element are arranged on and/or in the respective projection lens of the at least one lens arrangement.

5. The multi lens array according to claim 1, wherein the respective optical elements of the at least one lens arrangement comprises a picture frame, wherein the picture element is arranged on and/or in the picture frame.

6. The multi lens array according to claim 5, wherein the picture frame of the at least one lens arrangement is arranged after the respective projection lens.

7. The multi lens array according to claim 1, wherein a second one of the lens arrangements comprises a second at least partly transparent colored picture element having pigment elements that are (1) arranged in and/or on at least one of the respective optical elements of the second one of the lens arrangements and (2) the same as the pigment elements of the first at least partly transparent colored picture element.

8. The multi lens array according to claim 1, wherein the pigment elements and the at least one of the respective optical elements on and/or in which the pigment elements are arranged, are monolithically built in a sandwich molding process.

9. The multi lens array according to claim 1, wherein the pigment elements and the at least one of the respective optical elements on and/or in which the pigment elements are arranged, are monolithically built in an additive assembly process.

10. The multi lens array according to claim 1, wherein the pigment elements are formed as a printed layer onto a surface of the at least one of the respective optical elements on which the pigment elements are arranged.

11. The multi lens array according to claim 1, wherein at least one lens arrangement comprises an actuator element to change a focal point of the lens arrangement.

12. The multi lens array according to claim 1, wherein several of the lens arrangements are grouped in at least two groups of lens arrangements, wherein the multi lens array comprises at least one additional light source, wherein each of the at least one light source and the at least one additional light source are controlled separately and assigned to one of the at least two groups of lens arrangements.

13. The multi lens array according to claim 12, wherein a second one of the lens arrangements of the at least two groups of lens arrangements comprises a second at least partly transparent colored picture element having pigment elements that are (1) arranged in and/or on at least one of the respective optical elements of the second one of the lens arrangements and (2) different from the pigment elements of the first at least partly transparent colored picture element.

14. A luminous source for a vehicle, the luminous source comprising the multi lens array according to claim 1.

15. A vehicle comprising the luminous source according to claim 14.

* * * * *